(12) United States Patent
Lai et al.

(10) Patent No.: US 10,474,278 B2
(45) Date of Patent: Nov. 12, 2019

(54) TOUCH-CONTROL DISPLAY PANEL AND ELECTRONIC DEVICE

(71) Applicants: Xiamen Tianma Micro-electronics Co., Ltd., Xiamen (CN); Tianma Micro-electronics Co., Ltd., Shenzhen (CN)

(72) Inventors: Qingjun Lai, Xiamen (CN); Zhaokeng Cao, Xiamen (CN); Poping Shen, Xiamen (CN); Xiufeng Zhou, Xiamen (CN); Yihua Zhu, Xiamen (CN); Zhaodong Zhang, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 346 days.

(21) Appl. No.: 15/364,000

(22) Filed: Nov. 29, 2016

(65) Prior Publication Data
US 2017/0083149 A1 Mar. 23, 2017

(30) Foreign Application Priority Data
Aug. 23, 2016 (CN) .......................... 2016 1 0708850

(51) Int. Cl.
*G06F 3/041* (2006.01)
*G06F 3/044* (2006.01)
*G02F 1/1333* (2006.01)

(52) U.S. Cl.
CPC ............ *G06F 3/0416* (2013.01); *G06F 3/044* (2013.01); *G06F 3/0412* (2013.01); *G02F 1/13338* (2013.01)

(58) Field of Classification Search
CPC ...... G06F 3/0416; G06F 3/0412; G06F 3/044; G02F 1/13338
See application file for complete search history.

(56) References Cited

U.S. PATENT DOCUMENTS

2007/0279395 A1* 12/2007 Philipp .............. G01R 27/2605
345/173
2011/0181542 A1* 7/2011 Yang ....................... G06F 3/044
345/174

(Continued)

FOREIGN PATENT DOCUMENTS

CN 105760012 A 7/2016

*Primary Examiner* — Sejoon Ahn
(74) *Attorney, Agent, or Firm* — Anova Law Group PLLC

(57) ABSTRACT

A touch-control display panel and an electronic device are provided. The touch-control display panel comprises a first substrate, and the first substrate includes a display region and a non-display region surrounding the display region. The non-display region includes a first non-display region and a second non-display region. Further, a first electrode layer is disposed on the first substrate. The first electrode layer includes a first electrode matrix having at least three first electrode columns. Each first electrode column includes a plurality of first electrodes, and each first electrode is connected to an electrode line. The first electrode matrix is divided into a first electrode group and a second electrode group, the electrode lines corresponding to the first electrodes in the first electrode group extend from the first non-display region, and the electrode lines corresponding to the first electrodes in the second electrode group extend from the second non-display region.

17 Claims, 8 Drawing Sheets

(56) References Cited

U.S. PATENT DOCUMENTS

| | | | | |
|---|---|---|---|---|
| 2012/0139852 A1* | 6/2012 | Huang | ................... | G06F 3/0412 |
| | | | | 345/173 |
| 2014/0118277 A1* | 5/2014 | Kim | ........................ | G06F 3/044 |
| | | | | 345/173 |
| 2014/0253493 A1* | 9/2014 | Cho | ....................... | G06F 3/0412 |
| | | | | 345/174 |
| 2014/0333572 A1* | 11/2014 | Hu | .......................... | G06F 3/044 |
| | | | | 345/174 |
| 2014/0333582 A1* | 11/2014 | Huo | .................... | G02F 1/13338 |
| | | | | 345/174 |
| 2017/0083149 A1* | 3/2017 | Lai | ........................ | G06F 3/0416 |

* cited by examiner

TOUCH-CONTROL DISPLAY PANEL AND ELECTRONIC DEVICE

CROSS-REFERENCES TO RELATED APPLICATIONS

This application claims priority of Chinese Patent Application No. 201610708850.6, filed on Aug. 23, 2016, the entire contents of which are hereby incorporated by reference.

FIELD OF THE INVENTION

The present disclosure generally relates to the field of touch-control display technology and, more particularly, relates to a touch-control display panel and an electronic device.

BACKGROUND

With the development of human-computer interaction techniques, the touch-control technique has been increasingly applied in all kinds of display devices. Specifically, the capacitive touch-control technique has been widely used due to advantages such as good wear resistance, long service life, low maintenance cost during use, and support of gesture recognition and multi-touch.

Based on the detection methods for the capacitance between different touch components, the capacitive touch-control technique may be divided into the self-capacitive touch-control technique and the mutual capacitive touch-control technique. The self-capacitive touch-control technique may detect the existence, location and movement of an input object on a touch-control screen based on the variance in capacitance between the input object and the electrodes. The mutual capacitive touch-control technique may detect the existence, location and movement of an input object on the touch-control screen based on the variance in capacitance between the electrodes that is induced by the input object.

In current mutual capacitive touch-control display panels, a plurality of driving electrodes and a plurality of sensing electrodes are disposed on two substrates, respectively. The driving electrodes and the sensing electrodes extend along two directions, respectively. A variance in capacitance at or over the areas overlapped by the driving electrodes and the sensing electrodes may be used to detect where touch control occurs.

For example, FIG. 1 illustrates an existing touch-control display panel 100. A plurality of driving electrodes 140 extend along a Y direction and are arranged along an X direction. A plurality of sensing electrodes 130 are arranged in an array structure. The array structure includes two sensing electrode columns, and each sensing electrode column includes a plurality of sensing electrodes 130 arranged along the Y direction. Each sensing electrode extends along the X direction and is connected to an electrode line 150.

In current techniques, the array structure of the sensing electrodes 130 often only includes two sensing electrode columns. When the dimension of the touch-control display panel 100 increases and the touch-control precision is expected to be higher, two sensing electrode columns may fail to meet the dimension and precision requirements. In the meantime, when the number of sensing electrode columns increases, the number of electrode lines increases significantly, and the wiring design for the electrode lines becomes an urgent issue to be solved.

The disclosed touch-control display panel and electronic device are directed to solve one or more problems set forth above and other problems.

BRIEF SUMMARY OF THE DISCLOSURE

One aspect of the present disclosure provides a touch-control display panel comprising a first substrate. The first substrate includes a display region and a non-display region surrounding the display region. The non-display region includes a first non-display region and a second non-display region arranged along a first direction and located outside two opposite sides of the display region, respectively. Further, a first electrode layer is disposed on the first substrate. The first electrode layer includes a first electrode matrix having at least three first electrode columns. Each first electrode column includes a plurality of first electrodes arranged along a second direction, and each first electrode extends along the first direction and is connected to an electrode line. The first direction intersects the second direction. Further, the first electrode matrix is divided into a first electrode group and a second electrode group, the electrode lines corresponding to the first electrodes in the first electrode group extend from the first non-display region, and the electrode lines corresponding to the first electrodes in the second electrode group extend from the second non-display region.

Another aspect of the present disclosure provides an electronic device including a touch-control display panel. The touch-control display panel comprises a first substrate, and the first substrate includes a display region and a non-display region surrounding the display region. The non-display region includes a first non-display region and a second non-display region arranged along a first direction and located outside two opposite sides of the display region, respectively. Further, a first electrode layer is disposed on the first substrate. The first electrode layer includes a first electrode matrix having at least three first electrode columns. Each first electrode column includes a plurality of first electrodes arranged along a second direction, and each first electrode extends along the first direction and is connected to an electrode line. The first direction intersects the second direction. Further, the first electrode matrix is divided into a first electrode group and a second electrode group, the electrode lines corresponding to the first electrodes in the first electrode group extend from the first non-display region, and the electrode lines corresponding to the first electrodes in the second electrode group extend from the second non-display region.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined or separated under conditions without conflicts.

Figure 1:
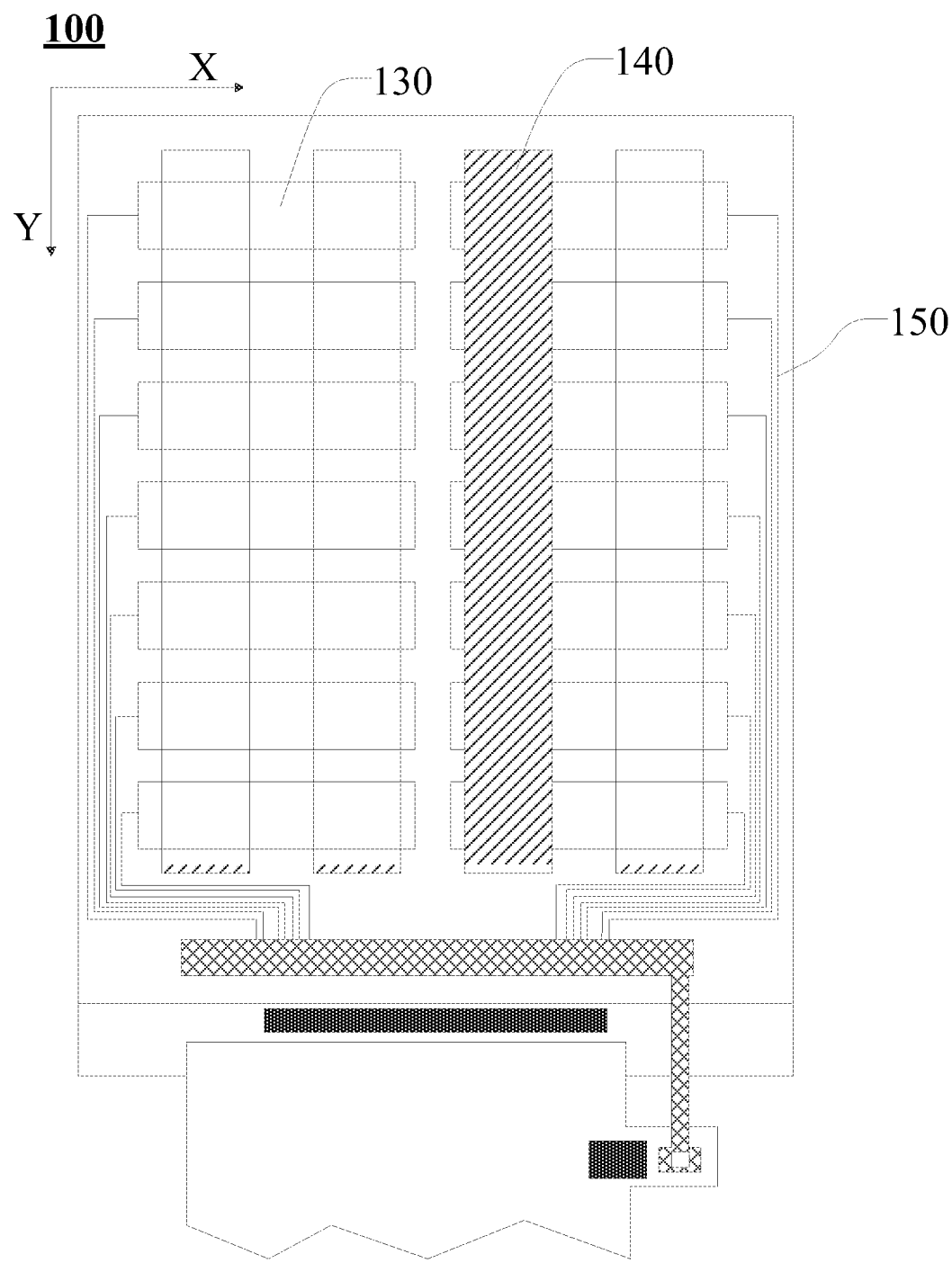
FIG. 1 illustrates a top view of an existing touch-control display panel.

Referring FIG. 1, when the dimension of a touch-control display panel 100 increases and touch-control precision is expected to be higher, two sensing electrode columns in existing touch-control display panels may fail to meet the need. Further, when the number of sensing electrode columns increases, the number of electrode lines also increases, and the wiring design for the electrode lines becomes an urgent issue to be solved.

The present disclosure provides an improved touch-control display panel and an electronic device. The disclosed touch-control display panel and electronic device not only satisfy touch-control display requirements for large-scale touch-control displays, but also realize a design for narrow frames.

Figure 2:
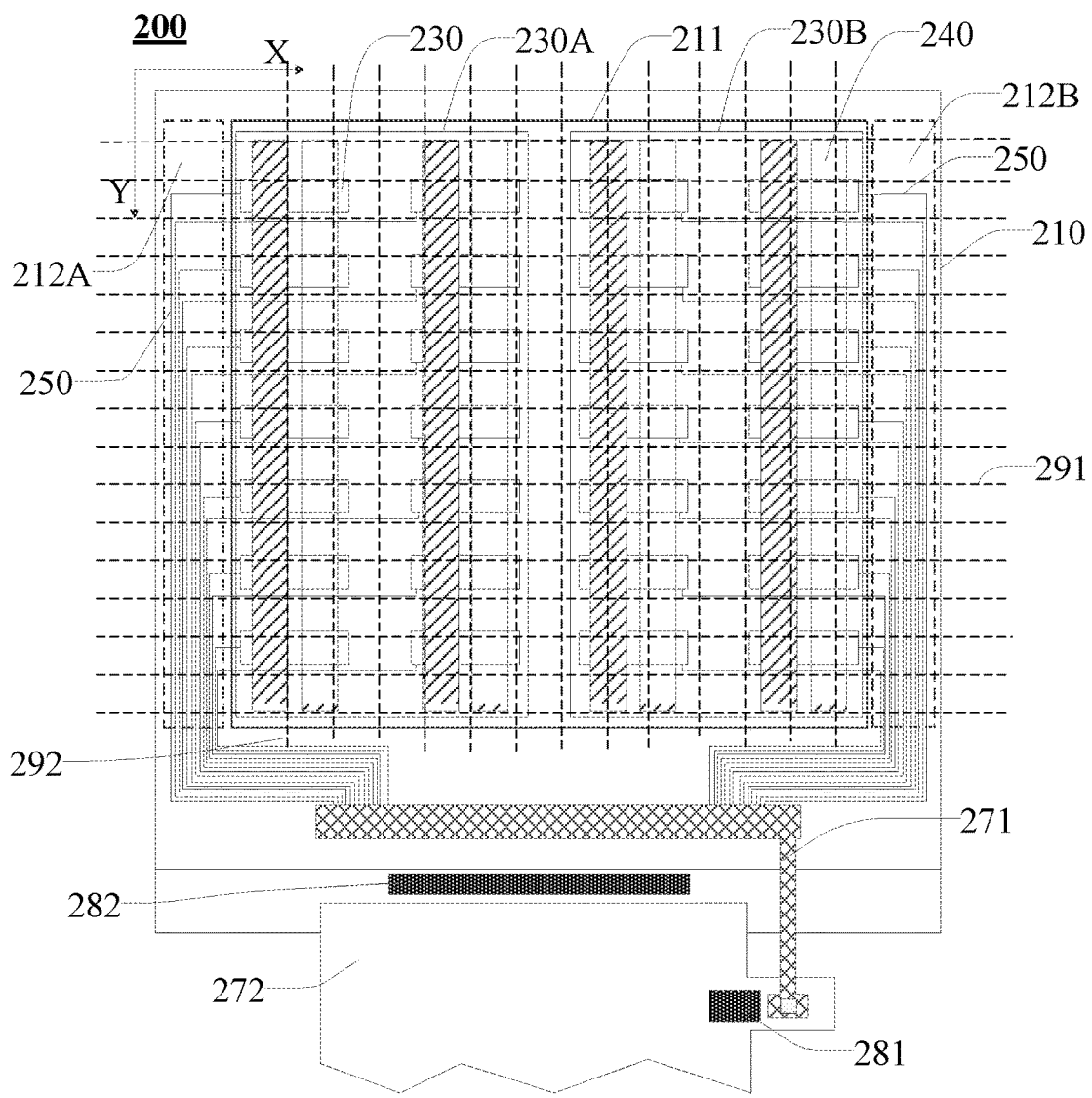
FIG. 2 illustrates a top view of an exemplary touch-control display panel consistent with disclosed embodiments.
Figure 3:
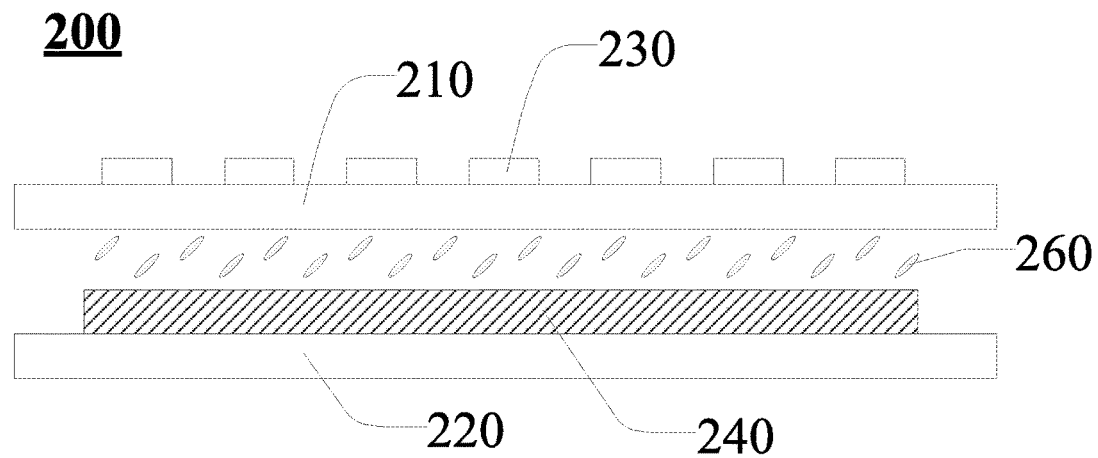
FIG. 3 illustrates a cross-sectional view of an exemplary touch-control display panel consistent with disclosed embodiments.

FIG. 2 and FIG. 3 illustrate an exemplary touch-control display panel 200 consistent with the disclosed embodiments. Referring to FIG. 2 and FIG. 3, the touch-control display panel 200 may include a first substrate 210 and a first electrode layer. The first electrode layer may be disposed on the first substrate 210. A first direction may be defined as an X direction, and a second direction may be defined as a Y direction.

The first substrate 210 may include a display region 211 and a non-display region disposed surrounding the display region 211. The non-display region may include a first non-display region 212A and a second non-display region 212B arranged along the X direction. The first non-display region 212A and the second non-display region 212B may be located outside two opposite sides of the display region 211. The display region 211 often includes a plurality of pixel units performing a display function and a plurality of electrodes performing a touch-control function. The non-display region often includes a wiring region for electrode lines.

The first electrode layer may include a first electrode matrix. The first electrode matrix may include at least three first electrode columns. In one embodiment, the first electrode matrix may include four first electrode columns, and each first electrode column may include a plurality of first electrodes 230 arranged along the Y direction. In one embodiment, each first electrode column may include seven first electrodes 230, which is not limited herein. Each first electrode 230 may extend along the X direction and be connected to an electrode line 250.

The X direction may intersect the Y direction. Optionally, the X direction may be perpendicular to the Y direction. In one embodiment, the first electrode layer may be centrosymmetric, thus the first electrode layer may be fabricated conveniently. By configuring the first electrode matrix to include at least three first electrode columns, the first electrode layer may satisfy touch-control display requirements for a large-scale touch-control display panel.

Specifically, the first electrode matrix may be divided into a first electrode group 230A and a second electrode group 230B. The electrode lines 250 corresponding to the first electrodes 230 in the first electrode group 230A may extend from the first non-display region 212A. The electrode lines 250 corresponding to the first electrodes 230 in the second electrode group 230B may extend from the second non-display region 212B. In one embodiment, the first electrode group 230A may be adjacent to the first non-display region 212A, and the second electrode group 230B may be adjacent to the second non-display region 212B.

Thus, in such configuration, the electrode lines 250 corresponding to the first electrodes 230 in each electrode group may all extend from an adjacent non-display region, thus benefiting a wiring design for the electrode lines 250 and a narrow frame design. The electrode lines 250 may be uniformly distributed in the non-display region of the touch-control display panel 200. Simultaneously, a wiring distance regarding the electrode line 250 from the first electrode 230 to a control unit may be relatively short, thus a wiring resistance may be relatively small, and touch-control sensitivity may be high. When carrying out touch control, signals may be supplied to the first electrodes 230 simultaneously from two opposite sides towards the middle column after column, and a touch-control detection efficiency may be relatively high.

In one embodiment, the first electrode group 230A and the second electrode group 230B may each include two first electrode columns. In some other embodiments, the first electrode group 230A and the second electrode group 230B may include different numbers of first electrode columns. The number of the first electrode columns in the first electrode group 230A and the number of the first electrode columns in the second electrode group 230B may not be limited herein. For example, the first electrode columns in the first electrode group 230A and the second electrode group 230B may, respectively, include 1~20 first electrode columns.

In one embodiment, the first electrode group 230A and the second electrode group 230B may include a same number of first electrode columns, thus the number of the electrodes 250 extending from the first non-display region 212A may be the same as the number of the electrodes 250 extending from the second non-display region 212B. Accordingly, the electrode lines 250 may be uniformly arranged. Further, the first electrode group 230A and the second electrode group 230B may both include 2 to 10 first electrode columns to satisfy the touch-control display requirements for large-scale touch-control display panels.

Further, the touch-control display panel 200 may also include a second substrate 220 disposed opposite to the first substrate 210, and a second electrode layer disposed on the second substrate 220. The second electrode layer may include a plurality of second electrodes 240 extending along the Y direction (the second direction) and arranged along the X direction (the first direction). An orthographic projection of each first electrode 230 on the second substrate 220 and an orthographic projection of at least one second electrode 240 on the second substrate 220 may have an overlapping region. The touch-control display panel 200 may detect a variance in capacitance at or over areas overlapped by the first electrodes 230 and the second electrodes 240 to detect a location where touch control occurs. Optionally, the second electrode layer disposed on the second substrate 220 may be centrosymmetric, thus the second electrode layer may be fabricated efficiently.

In one embodiment, the orthographic projection of each first electrode 230 on the second substrate and orthographic projections of two second electrodes 240 on the second substrate 220 may have overlapping regions. However, FIG. 2 is for illustrative purpose only, and those skilled in the art may envision other possible variations based on needs. For example, the orthographic projection of each first electrode 230 on the second substrate 220 and orthographic projections of 2~70 second electrodes 240 on the second substrate 220 may have overlapping regions. The number of the second electrodes 240 overlapping each first electrode 230 may be the same or may be different.

The first electrodes 230 in the first electrode layer and the second electrodes 240 in the second electrode layer may be made of a transparent conductive material such as indium tin oxide (ITO), indium zinc oxide (IZO), etc., or may be made of a metallic material. The metallic material may be Al, Ti, Ag, Mo, W, Cu, Cr, or an alloy containing one or more of Al, Ti, Ag, Mo, W, Cu, and Cr.

In one embodiment, the touch-control display panel 200 may be a liquid crystal display panel using a liquid crystal display technique. Specifically, the first substrate 210 may be a color film substrate, and the second substrate 220 may be an array substrate. The touch-control display panel 200 may also include a liquid crystal layer 260 sandwiched between the first substrate 210 and the second substrate 220. Further, the second substrate 220 may also include a plurality of thin film transistors, a plurality of scanning lines 291, a plurality of data lines 292, a common electrode layer and a pixel electrode layer (not shown) disposed on a glass substrate or a polyimide substrate. Specifically, the plurality of data lines 292 and the plurality of scanning lines 291 may intersect each other. An extension direction of the scanning lines 291 may be parallel to the X direction, and an extension direction of the data lines 292 may be parallel to the Y direction. Optionally, the common electrode layer and the pixel electrode layer on the second substrate 220 may be applied to drive a liquid crystal material to rotate, and the first substrate 210 may be used to colorize the touch-control display panel 200.

In one embodiment, the first electrode layer may be disposed on one side of the first substrate 210 facing away the second substrate 220. The second electrode layer may be disposed on the second substrate 220 facing towards the first substrate 210. Accordingly, the first electrode layer may get closer to a touch location, thus improving touch-control performance of the display panel. However, the present disclosure is not limited thereto. For example, the first electrode layer may be disposed on one side of the first substrate facing towards the second substrate 220, or the second electrode layer may be disposed on the second substrate 220 facing away the first substrate 210. Combinations thereof may also be used, and are not repeated here.

In one embodiment, the first electrodes 230 may be used as touch-control sensing electrodes (i.e., Rx electrodes), and the second electrodes 240 may be used as touch-control driving electrodes (i.e., Tx electrodes). Further, the second electrodes 240 may be multiplexed as common electrodes to simplify a layered structure of the touch-control display panel 200 and reduce a thickness of the touch-control display panel 200. In particular, during a display stage, the second electrodes 240 may be used as common electrodes. During a touch-control stage, the second electrodes 240 may be used as touch-control driving electrodes. That is, the second electrodes 240 may not only be used for display, but also for touch control.

For example, when the second electrodes 240 are used as the common electrodes for display, the control unit (e.g., a display chip 282) may send display driving signals, such as driving voltages with a same potential-level needed for display, to the second electrodes 240. Accordingly, the liquid crystal material may be driven to rotate for display functions. When the second electrodes 240 are used as touch-control driving electrodes for touch control, the control unit may send touch-control driving signals to the second electrodes 240. For example, the control unit may sequentially send driving signals needed for touch control to a plurality of second electrodes 240, and may cooperate with a plurality of first electrodes 230 in the first electrode layer to realize a touch-control detection function.

In one embodiment, the touch-control display panel 200 may also include a first flexible printed circuit 271, a second flexible printed circuit 272, a touch-control chip 281, and a display chip 282.

Specifically, the first flexible printed circuit 271 and the second flexible printed circuit 272 may be used to transmit signals. The display chip 282 may supply display driving signals to the common electrodes via the second flexible printed circuit 272, and drive the liquid crystal material or liquid crystal molecules to rotate, thus displaying images. The touch-control chip 281 may, respectively, supply touch-control sensing signals and touch-control driving signals to the first electrodes 230 and the second electrodes 240 via the first flexible printed circuit 271 and the second flexible printed circuit 272.

Specifically, when touch control occurs, a capacitance at the overlapping region between the first electrodes 230 and the second electrodes 240 may vary. The first electrodes 230 may detect a variance in capacitance, and the touch-control chip 281 may send the touch-control sensing signals to the first electrodes 230 via the first flexible printed circuit 271. The touch-control chip 281 may conduct corresponding processing based on sensed signals, for example, an occurrence of touch control and a location where the touch control occurs may be determined based on capacitance variance and a location of a signal source. Here, a touch-control method for the disclosed touch-control display panel 200 is used for illustrative purposes only, and specific touch-control methods are not limited herein.

The above-described design of the chip and flexible printed circuit for signal control and signal transmission is for illustrative purposes only, and those skilled in the art will appreciate that control methods in other forms may also be applied. For example, the first flexible printed circuit 271 and the second flexible printed circuit 272 may be integrated to become a one-piece flexible printed circuit. The display chip 282 and the touch-control chip 281 may be integrated to become an integrated chip that have both a display control function and a touch-control control function.

Figure 4:
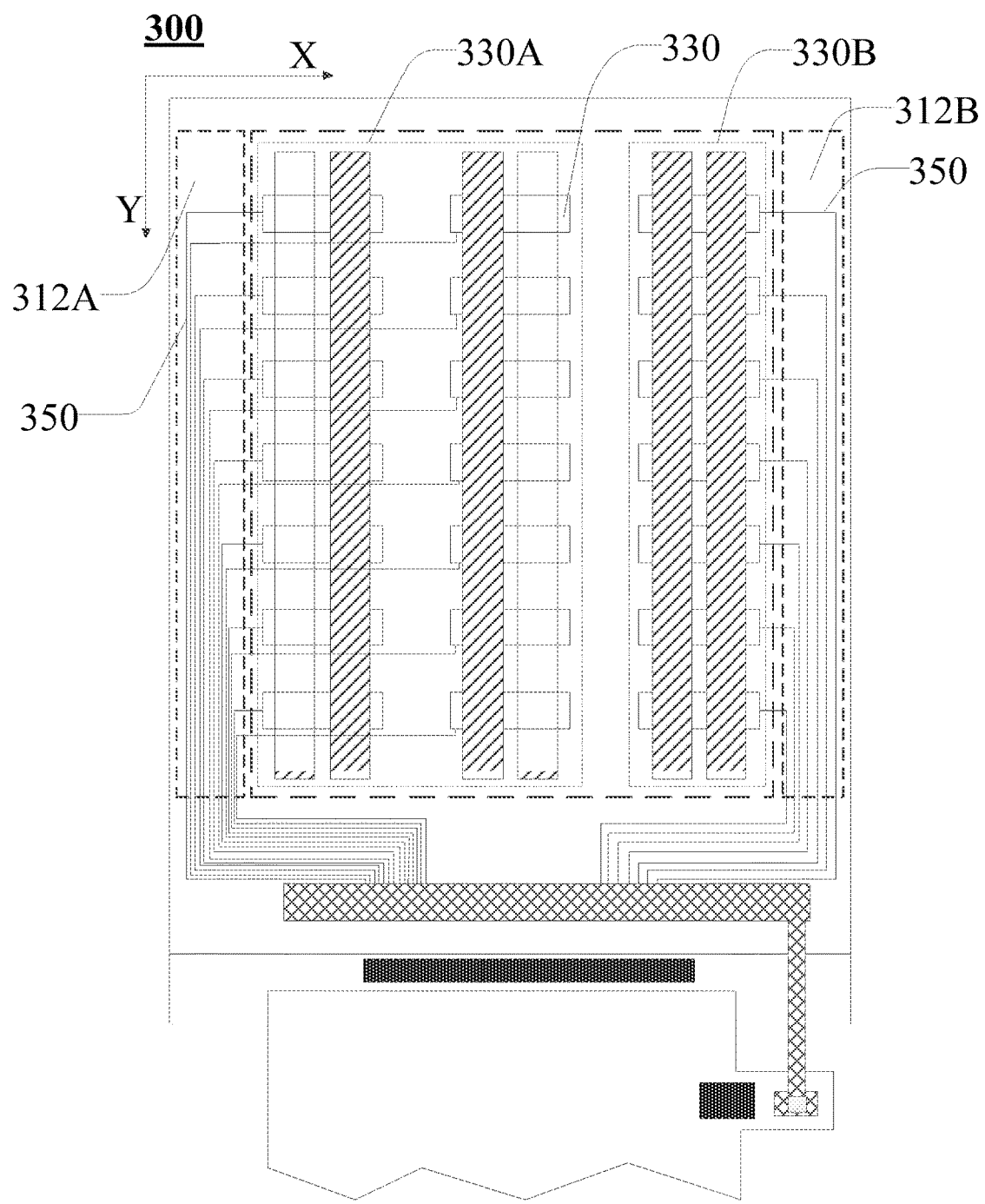
FIG. 4 and FIG. 5 illustrate top views of another exemplary touch-control display panel consistent with disclosed embodiments.
Figure 5:
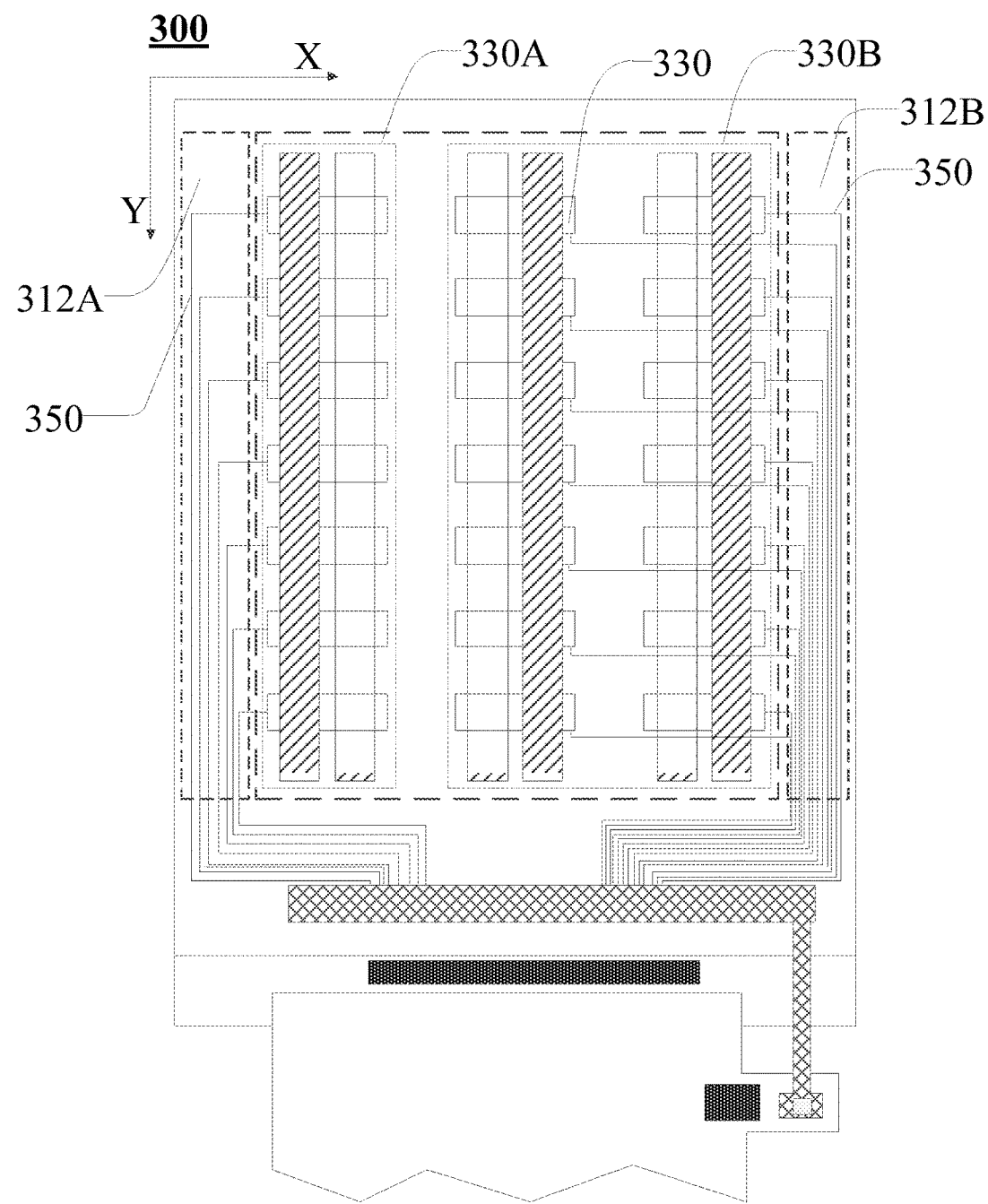

Referring to FIG. 4 and FIG. 5, FIG. 4 and FIG. 5 illustrate another exemplary touch-control display panel 300 showing a similar structure to the touch-control display panel 200. As shown in FIG. 4 and FIG. 5, in a first electrode matrix disposed in a first electrode layer, a first electrode group 330A may be adjacent to a first non-display region 312A, and a second electrode group 330B may be adjacent to a second non-display region 312B.

Different from the first electrode matrix in the touch-control display panel 200, the first electrode matrix in the touch-control display panel 300 may include an odd number of first electrode columns. The odd number of first electrode columns may be divided into the first electrode group 330A and the second electrode group 330B. The first electrode group 330A may differ from the second electrode group 330B by having one more or one less first electrode column. Specifically, in the first electrode matrix illustrated in FIG. 4, the first electrode group 330A may have one more first electrode column than the second electrode group 330B. In the first electrode group matrix illustrated in FIG. 5, the first electrode group 330A may have one less first electrode column than the second electrode group 330B. Electrode lines 350 corresponding to first electrodes 330 in the first electrode group 330A may extend from the first non-display region 312A, and the electrode lines 350 corresponding to the first electrodes 330 in the second electrode group 330B may extend from the second non-display region 312B. The number of the electrode lines 350 in the first non-display region 312A may not differ much from the number of the electrode lines 350 in the second non-display region 312B. The electrode lines 350 may be distributed relatively uniformly in the non-display region of the touch-control display panel 300. Accordingly, a disordered arrangement of the electrode lines 350 may be avoided, which is beneficial for wiring design of the electrode lines 350 and the design of narrow frames.

In one embodiment, the first electrode group 330A and the second electrode group 330B may, respectively, include one or two first electrode columns. However, FIG. 4 and FIG. 5 are for illustrative purposes only, and those skilled in the art may envision other possible variations based on needs. For example, the first electrode group 230A and the second electrode group 230B may include 2~10 first electrode columns, respectively.

Figure 6A:
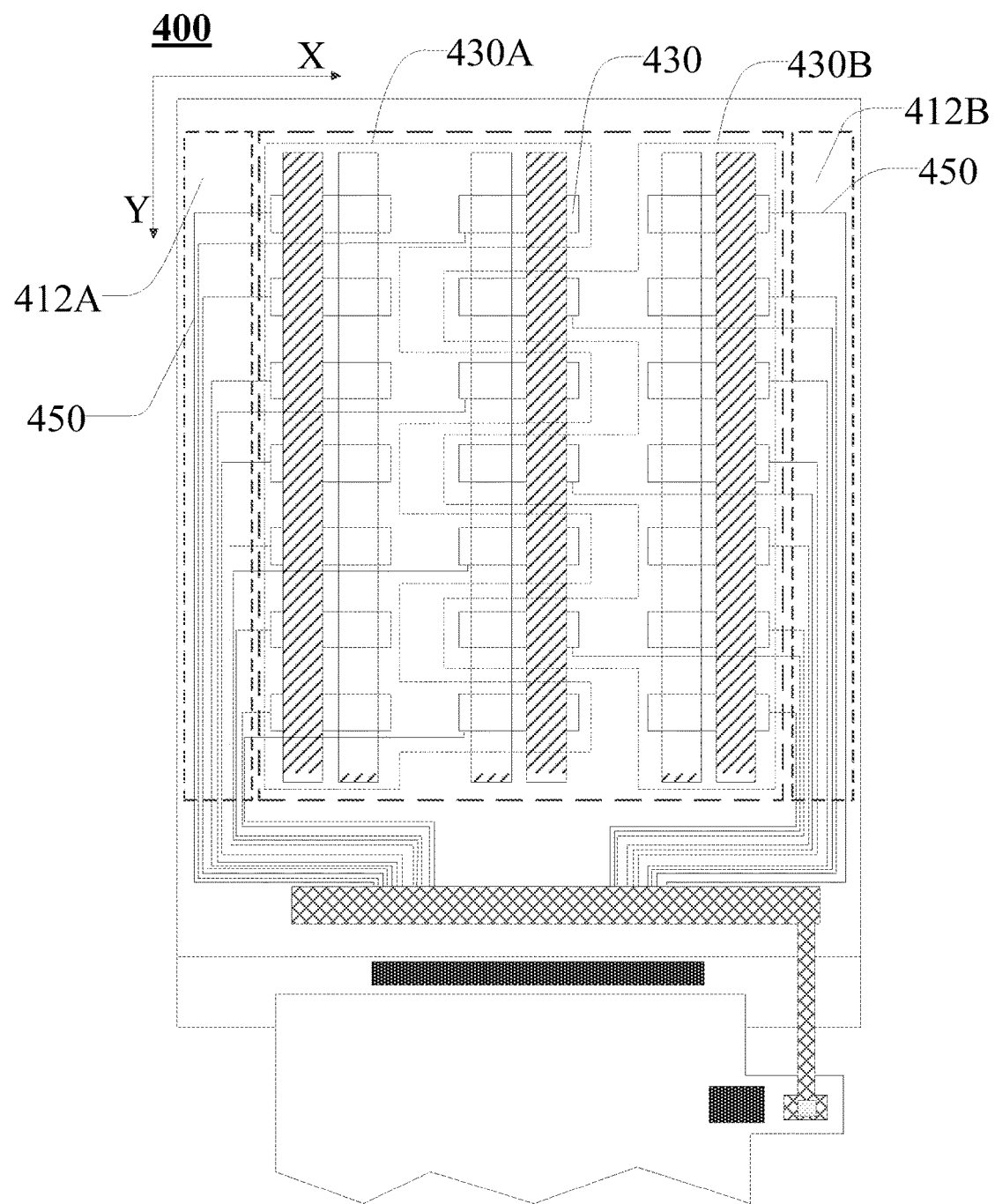
FIG. 6A illustrates a top view of an exemplary touch-control display panel consistent with disclosed embodiments.
Figure 6B:
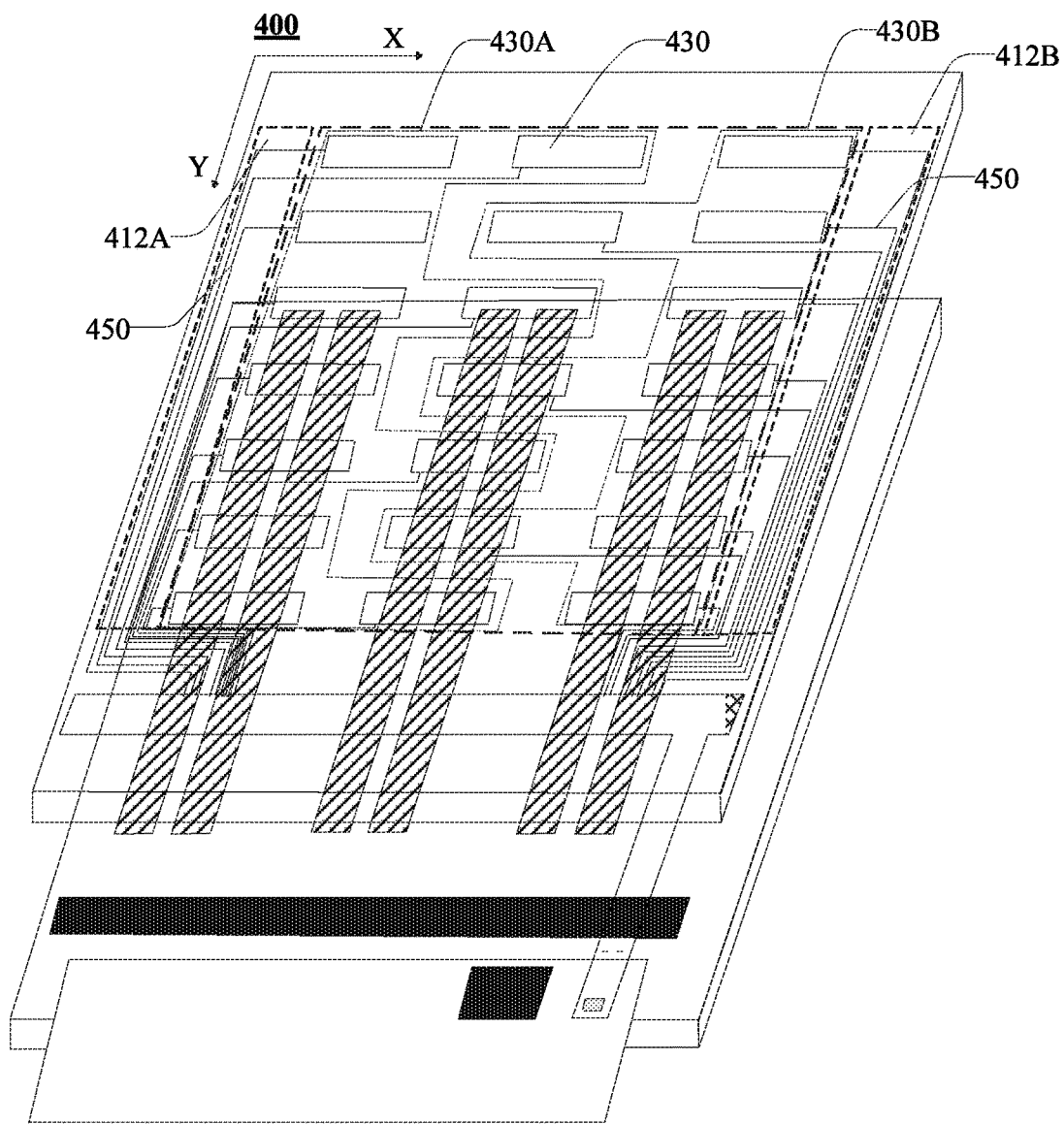
FIG. 6B illustrates a perspective view of an exemplary touch-control display panel consistent with disclosed embodiments.

Referring to FIG. 6A and FIG. 6B, FIG. 6A and FIG. 6B illustrate an exemplary touch-control display panel 400 having a similar structure to the touch-control display panel 200. As shown in FIG. 6A and FIG. 6B, in a first electrode matrix in a first electrode layer, a first electrode group 430A may be adjacent to a first non-display region 412A, and a second electrode group 430B may be adjacent to a second non-display region 412B.

Different from the first electrode matrix in the touch-control display panel 200, the first electrode matrix in the touch-control display panel 400 may include 2N+1 first electrode columns, where N is an integer greater than or equal to 1. The first electrode group 430A may include 1st, 2nd, . . . , Nth first electrode column. Electrode lines 450 corresponding to first electrodes 430 in the 1st, 2nd, . . . , Nth first electrode column may extend from the first non-display region 412A. The second electrode group 430B may include (N+2)th, (N+3)th, . . . , (2N+1)th first electrode column.

The electrodes lines 450 corresponding to the first electrodes 430 in the (N+2)th, (N+3)th, . . . , (2N+1)th first electrode column may extend from the second non-display region 412B. Any two adjacent first electrodes in the (N+1)th first electrode column may belong to the first electrode group 430A and the second electrode group 430B, respectively. That is, the electrode lines 450 corresponding to any two adjacent first electrodes 430 in the (N+1)th first electrode column may extend from the first non-display region 412A and the second non-display region 412B, respectively. The number of the electrode lines 450 in the first non-display region 412A may be the same as the number of the electrode lines 450 in the second non-display region 412B. Compared to the electrode lines 350 in the touch-control display panel 300, the electrode lines 450 in the touch-control display panel 400 may be more uniformly distributed in non-display region of the touch-control display panel 400, thus further improving rationality of wiring arrangement for the electrode lines 450.

In one embodiment, the first electrode matrix may include three first electrode columns. The first electrode group 430A may include a 1st first electrode column and a plurality of first electrodes 430 in odd rows of a 2nd first electrode column. The second electrode group 430B may include a 3rd first electrode column and a plurality of first electrodes 430 in even rows of the 2nd first electrode column. However, FIG. 6A and FIG. 6B are for illustrative purposes only, and those skilled in the art may envision other possible variations based on needs. For example, the first electrode group 230A and the second electrode group 230B may each include 2~10 first electrode columns and a plurality of first electrodes 430 in a middle first electrode column.

Figure 7:
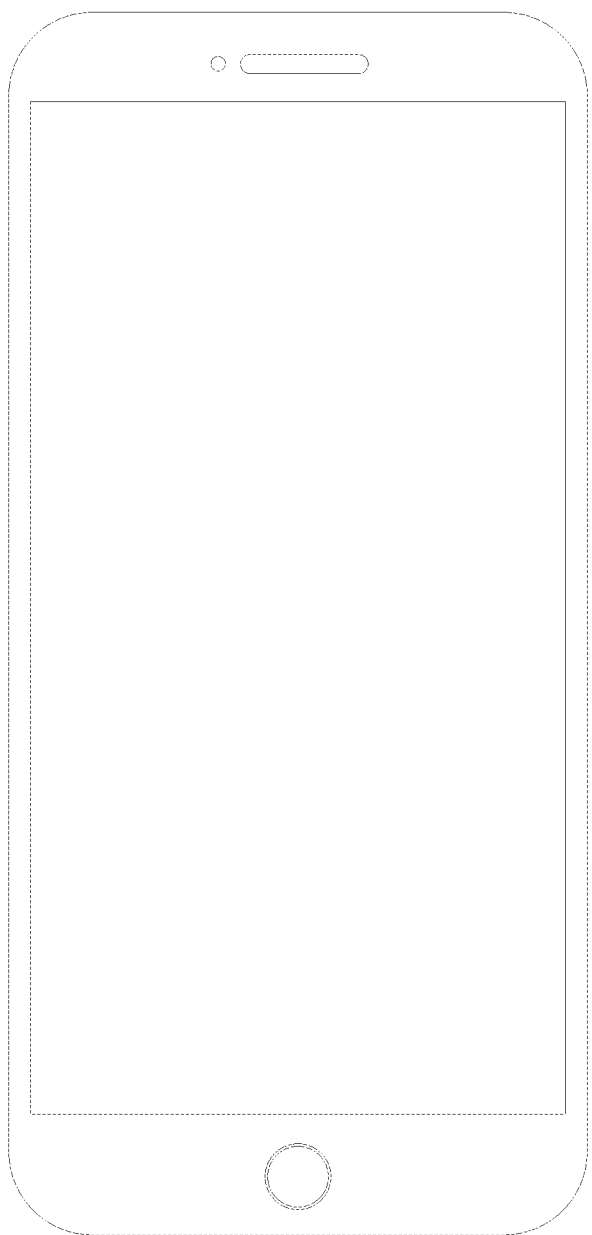
FIG. 7 illustrates an exemplary electronic device consistent with disclosed embodiments.

Referring to FIG. 7, one aspect of the present disclosure provides an exemplary electronic device including a disclosed touch-control display panel. The electronic device may include, but not limited to, a cell phone 10 (shown in FIG. 7), a tablet computer, a laptop computer, or a desktop computer. The electronic device may adopt a liquid crystal display (LCD) technique, or an organic light emitting display (OLED) technique. Those skilled in the art may easily understand that more embodiments may be derived from the disclosed touch-control display panel, which is not repeated here.

Thus, compared to existing techniques, in the disclosed touch-control display panel and electronic device, the first electrode matrix may be configured to include at least three first electrode columns. Accordingly, the first electrode layer may satisfy the touch-control display requirements for large-scale touch-control display panels. Simultaneously, the electrode lines corresponding to the first electrodes in the first electrode group and the second electrode group may all extend from an adjacent non-display region, thus benefiting the wiring design of the electrode lines and the design of narrow frames.

The electrode lines may be distributed uniformly in the non-display region of the touch-control display panel. Simultaneously, the wiring distance regarding the electrode line from the first electrode to the control unit may be relatively short, the wiring resistance may be relatively small, and the touch-control sensitivity may be relatively high. When carrying out touch control, signals may be supplied to the first electrodes simultaneously from two opposite sides towards the middle, thus improving the touch-control efficiency.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A touch-control display panel, comprising:
a first substrate including a display region and a non-display region surrounding the display region, wherein the non-display region includes a first non-display region and a second non-display region arranged along a first direction and located outside two opposite sides of the display region, respectively; and a first electrode layer disposed on the first substrate, the first electrode layer including a first electrode matrix having at least three first electrode columns, wherein each first electrode column includes a plurality of first electrodes arranged along a second direction, each of the plurality of first electrodes extends along the first direction and is connected to a respective electrode line that extends to the non-display region and stays separated from each other in the non-display region, and the first direction intersects the second direction, wherein first electrodes in the first electrode matrix are divided into a first electrode group and a second electrode group, electrode lines corresponding to a plurality of first electrodes in the first electrode group extend from the plurality of first electrodes in the first electrode group to the first non-display region, and electrode lines corresponding to a plurality of first electrodes in the second electrode group extend from the plurality of second electrodes in the second electrode group to the second non-display region,
a second substrate disposed opposite to the first substrate; and a second electrode layer disposed on the second substrate, the second electrode layer including a plurality of second electrodes extending along the second direction and arranged along the first direction,
wherein: an orthographic projection of each first electrode on the second substrate and an orthographic projection of at least one second electrode on the second substrate have an overlapping region, and
wherein: the orthographic projection of each first electrode on the second substrate and orthographic projections of two to seventy second electrodes on the second substrate have an overlapping region.

2. The touch-control display panel according to claim 1, wherein: the first electrode group is adjacent to the first non-display region, the second electrode is adjacent to the second non-display region, and the first electrode group and the second electrode group include same number of the first electrode columns.

3. The touch-control display panel according to claim 1, wherein: the first electrode group is adjacent to the first non-display region, the second electrode group is adjacent to the second non-display region, and the first electrode group includes one more or one less first electrode column than the second electrode group.

4. The touch-control display panel according to claim 1, wherein: the first electrode matrix includes 2N+1 first electrode columns, where N is an integer greater than or equal to 1; the first electrode group includes 1st, 2nd, . . . , Nth first electrode columns, and is adjacent to the first non-display region; the second electrode group includes (N+2), (N+3), . . . , (2N+1) first electrode columns, and is adjacent to the second non-display region; and each of two adjacent first electrodes in (N+1)th first electrode column belongs to a different electrode group of the first electrode group and the second electrode group.

5. The touch-control display panel according to claim 2, wherein: each of the first electrode group and the second electrode group includes two to ten first electrode columns.

6. The touch-control display panel according to claim 1, wherein: the first direction is perpendicular to the second direction.

7. The touch-control display panel according to claim 1, wherein: the first electrode layer is disposed on one side of the first substrate facing away the second substrate; and the second electrode layer is disposed on one side of the second electrode layer facing towards the first substrate.

8. The touch-control display panel according to claim 1, wherein: the second substrate includes a plurality of scanning lines and a plurality of data lines, and the plurality of scanning lines intersect the plurality of data lines, where an extension direction of the scanning lines is parallel to the first direction, and an extension direction of the data lines is parallel to the second direction.

9. The touch-control display panel according to claim 1, wherein: the first electrode layer is centrosymmetric.

10. The touch-control display panel according to claim 1, wherein: the second electrode layer is centrosymmetric.

11. The touch-control display panel according to claim 1, wherein: the first electrodes are touch-control sensing electrodes; and the second electrodes are touch-control driving electrodes.

12. The touch-control display panel according to claim 11, wherein: the second electrodes are multiplexed as common electrodes; during a display stage, the second electrodes are used as common electrodes; and during a touch-control stage, the second electrodes are used as touch-control driving electrodes.

13. The touch-control display panel according to claim 1, wherein: a first substrate is a color film substrate; a second substrate is an array substrate; and the touch-control display panel further comprises a liquid crystal layer sandwiched between the first substrate and the second substrate.

14. An electronic device including a touch-control display panel, wherein the touch-control display panel comprises: a first substrate including a display region and a non-display region surrounding the display region, wherein the non-display region includes a first non-display region and a second non-display region arranged along a first direction and located outside two opposite sides of the display region, respectively; and a first electrode layer disposed on the first substrate, the first electrode layer including a first electrode matrix having at least three first electrode columns, wherein each first electrode column includes a plurality of first electrodes arranged along a second direction, each of plurality of first electrodes extends along the first direction and is connected to a respective electrode line that extends to the non-display region and stays separated from each other in the non-display region, and the first direction intersects the second direction, wherein first electrode nodes in the first electrode matrix are divided into a first electrode group and a second electrode group, electrode lines corresponding to a plurality of first electrodes in the first electrode group extend from the plurality of first electrodes in the first electrode group to the first non-display region, and electrode lines corresponding to a plurality of first electrodes in the second electrode group extend from the plurality of first electrodes in the second electrode group to the second non-display region,
a second substrate disposed opposite to the first substrate; and a second electrode layer disposed on the second substrate, the second electrode layer including a plurality of second electrodes extending along the second direction and arranged along the first direction, wherein: an orthographic projection of each first electrode on the second substrate and an orthographic projection of at least one second electrode on the second substrate have an overlapping region, and wherein: the orthographic projection of each first electrode on the second substrate and orthographic projections of two to seventy second electrodes on the second substrate have an overlapping region.

15. The electronic device according to claim 14, wherein: the first electrode group is adjacent to the first non-display region, the second electrode is adjacent to the second non-display region, and the first electrode group and the second electrode group include same number of the first electrode columns.

16. The electronic device according to claim 14, wherein: the first electrode group is adjacent to the first non-display region, the second electrode group is adjacent to the second non-display region, and the first electrode group includes one more or one less first electrode column than the second electrode group.

17. The electronic device according to claim 14, wherein: the first electrode matrix includes 2N+1 first electrode columns, where N is an integer greater than or equal to 1; the first electrode group includes 1st, 2nd, . . . , Nth first electrode columns, and is adjacent to the first non-display region; the second electrode group includes (N+2), (N+3), . . . , (2N+1) first electrode columns, and is adjacent to the second non-display region; and each of two adjacent first electrodes in (N+1)th first electrode column belongs to a different electrode group of the first electrode group and the second electrode group.

* * * * *